Nov. 1, 1966   M. R. HUTCHISON, JR   3,282,180
AUTOMATIC FLASH CONTROL DEVICE FOR PHOTOGRAPHIC CAMERAS
Original Filed Aug. 6, 1962
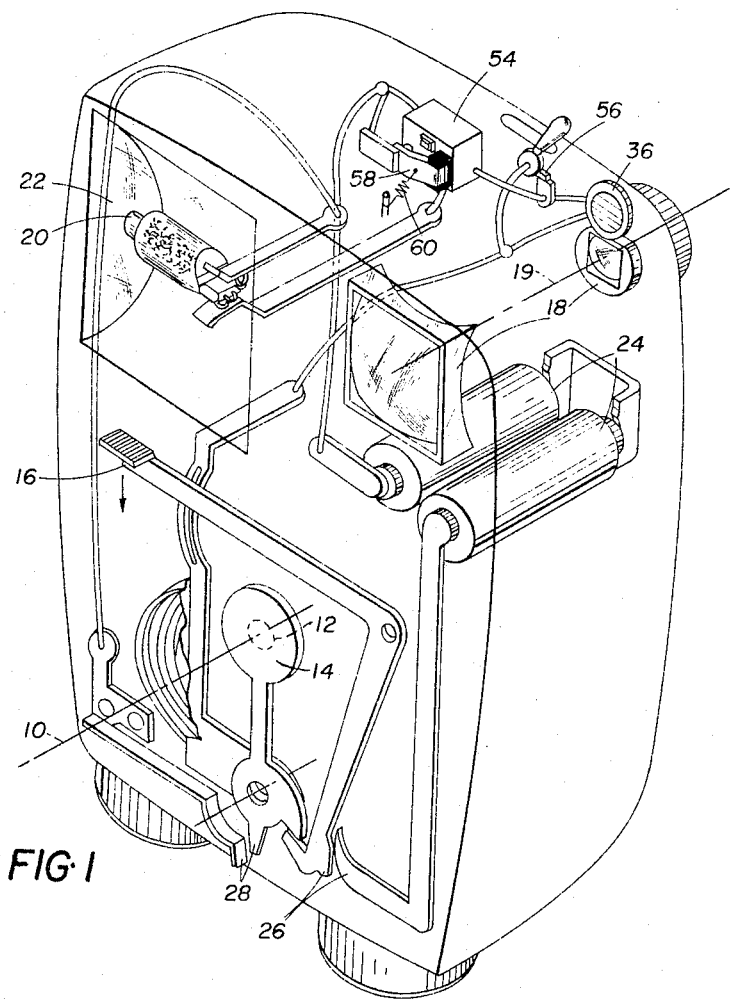
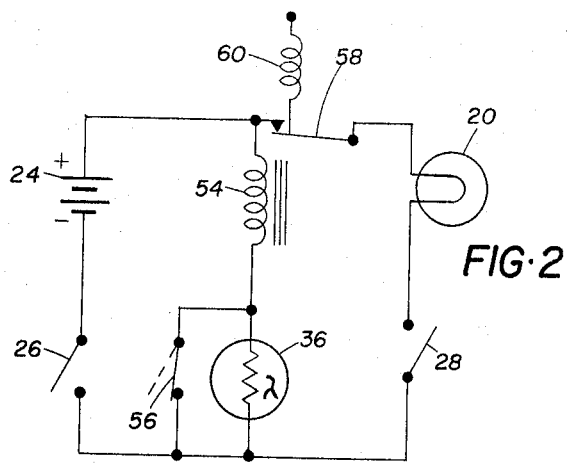
MILLER R. HUTCHISON, JR.
INVENTOR.
BY
ATTORNEYS 3,282,180
AUTOMATIC FLASH CONTROL DEVICE FOR PHOTOGRAPHIC CAMERAS
Miller R. Hutchison, Jr., Rochester, N.Y., assignor to Eastman Kodak Company, Rochester, N.Y., a corporation of New Jersey
Original application Aug. 6, 1962, Ser. No. 215,044. Divided and this application June 29, 1964, Ser. No. 378,848
Claims priority, application Great Britain, June 14, 1962, 22,844/62
2 Claims. (Cl. 95—11)

The present invention relates to photographic cameras and more particularly concerns automatic flash control systems for such cameras. This application is a divisional application of U.S. application Serial No. 215,044, filed August 6, 1962, now abandoned.

In cameras it has long been customary to employ photoflash lamps, timed with the camera shutters, to illuminate photographic subjects when scene brightness is low. The use of such photoflash lamps has given rise to several problems, the primary one being that the camera operator has had to make some determination of the necessity for flash operation.

With the advent of photoelectrically controlled exposure systems, it became a common practice to provide a camera with a viewfinder signal to indicate visually when the subject illumination is too low for normal photography and that flash operation is required for proper exposure. Nevertheless the problems of flash operation were still not ended. When the camera operator aims the camera he naturally wants to take a picture at that time. When he is apprised even by an automatic signal that flash operation is required, he must make any necessary adjustments of the camera for flash operation, e.g., coupling the diaphragm adjustment to the focus adjustment, manually setting the diaphragm and shutter, and of course inserting a flashlamp into the camera. By the time such adjustments have been made, and assuming that the photographer has the necessary flashlamp within convenient access, quite often the subject brightness has changed or the event to be recorded has transpired. It is then prudent for the photographer to remove the flashlamp from the camera unless he intends to next picture to be taken under flash conditions.

The above operation is entirely unsatisfactory and tends to discourage photography. It leads to waste of film when the photographer either forgets to insert a flashlamp or tires, without one, to photograph a relatively dark, transient event. It leads to waste of flashlamps, and possible overexposure of a subsequent picture when the photographer forgets to remove an unused flashlamp from the camera after an unsuccessful attempt to readjust the camera for flash operation before an event has transpired.

It is therefore a primary object of the present invention to control the operation of a flash bulb in a camera automatically, without any attention by or knowledge of the camera operator, such that flash operation will occur when scene brightness is at a low enough level to require it, but will not occur otherwise.

A further object of the invention is to permit a flashlamp to be carried in a camera socket at all times and automatically to prevent its ignition except during low levels of field brightness.

Another object of the invention is to control the flash operation of a camera photoelectrically.

A still further object of the invention is to substitute a relatively rugged and reliable flash control switch means for a delicately balanced exposure meter.

This invention is particularly useful in connection with cameras having photoelectric control systems employing relays, such as the systems illustrated in copending application Serial No. 191,977, filed May 2, 1962, and now abandoned in favor of continuing application Serial No. 265,635, filed March 18, 1963.

Other objects and advantages of the invention will appear from the following description, reference being made to the accompanying drawings, wherein:

FIG. 1 is a partial perspective view of a camera showing the elements of the present invention and the camera elements cooperating therewith; and FIG. 2 is a schematic wiring diagram of the invention as described.

Referring to FIGS. 1 and 2, a camera embodying the present invention has an optical axis 10 on which are located the usual exposure aperture 12 and shutter blade 14. A camera actuating member 16 operates the shutter in a well known manner. A viewfinder 18 may be located on a second optical axis 19.

A flash bulb 20 is mounted in front of a reflector 22. The flash lamp 20 is in a series circuit with a source of electrical potential such as battery 24 and with a normally open line switch 26 that prevents the battery 24 from being discharged when the camera is not in use. The usual shutter timing switch 28 is also in series circuit with the flash bulb 20, as is a flash lamp control switch 58, biased to its closed condition or position by a spring 60. Connected in parallel with the flash bulb 20, switch 58 and shutter synchronizing switch 28 is a light dependent photoresistive device 36, such as a cadmium sulfide cell, and an electromagnetic relay coil 54 operatively controlling switch 58. The light dependent resistor or photocell 36 is disposed for illumination by scene light and for convenience may be located in the viewfinder as illustrated in FIG. 1. Battery 24 is in the circuit with such polarity that its negative terminal is connected to the terminal of cell 36 opposite relay coil 54.

A normally closed relay control switch 56 is connected in parallel with photocell 36 and permits relay 54 to be fully energized when line switch 26 is closed, regardless of field brightness. Control switch 56 is then opened to connect photocell 36 into the relay circuit, thereafter controlling the realy energization as a function of field brightness. If field brightness is above a predetermined value, a considerable current flows through cell 36, energizing relay 54 sufficiently to hold the normally closed lamp control switch 58 in an open condition against the tension of spring 60, thereby disabling the lamp firing circuit. If field brightness is low, the resistance of photocell 36 is high and relay energization is too low to hold open the switch 58. In this state the lamp 20 is fired when shutter synchronizing switch 28 is closed.

In operation, the shorting switch 56 is manually opened to connect the photocell 36 into the relay circuit. When the camera actuating member 16 is moved in the direction shown by the arrow in FIG. 1, it first closes line switch 26 and then operates the shutter in a known manner, which in turn closes the shutter synchronizing switch 28. If at this time the scene brightness is sufficiently high, the resistance of cell 36 is relatively low, thereby permitting sufficient current to flow through the relay coil 54 and energizing the relay sufficiently to hold switch 58 open to disable the lamp firing circuit. If, however, scene brightness is below a predetermined level, the resistance of cell 36 is above a corresponding level, and relay energization is too low to hold switch 58 open. Consequently, lamp 20 is fired automatically when shutter synchronizing switch 28 is closed.

From the foregoing it will be seen that the operation of the flash bulb is completely automatic and requires no attention from the camera operator, nor need the camera operator be aware of the conditions requiring flash operation.

While the invention has been described in detail with particular reference to the preferred embodiment shown, it will be understood that variations and modifications can be effected without departing from the spirit of the invention and the scope of the subjoined claims.

I claim:
1. In a camera adapted to receive a flash lamp, the combination comprising:
   means to electrically receive a flash lamp, a source of electrical potential and a switching means in series with said lamp receiving means;
   a shutter synchronizing switch in series with said flash lamp receiving means to close the flash lamp receiving means circuit in timed relationship with operation of a shutter;
   a photoresistive cell illuminatable by field light and in parallel electrically with said flash lamp receiving means;
   an electromagnetic relay in series electrically with said photoresistive cell and in parallel with said flash lamp receiving means and said switching means;
   spring means urging the switching means to a closed position to enable firing of a flashlamp in the receiving means, the relay overcoming said spring means to maintain the switching means in an open condition and prevent firing only when said relay is energized above a predetermined level whenever the resistance in said photoresistive cell is below a predetermined level as determined by field light; and
   shorting switch means in parallel with said photoresistive cell to permit said source to energize the relay and maintain the switching means in an open condition independently of the photoresistive cell.
2. In a photographic camera adapted to receive a flashlamp, an automatically controlled flash lamp firing circuit comprising:
   means to electrically receive a flashlamp;
   means to receive a source of electrical potential in series electrically with said lamp receiving means to fire a flash lamp in the lamp receiving means;
   a lamp control switch in series electrically with said source of electrical potential and said lamp receiving means, the lamp control switch having an open condition disabling the firing circuit and a closed condition to enable flash lamp firing;
   spring means normally biasing the lamp control switch to the closed position;
   a photoresistive device disposed for illumination by ambient field light and connected in parallel electrically with said lamp receiving means and said lamp control switch;
   an electromagnetic relay operatively controlling the lamp control switch and connected in series electrically with said photoresistive device and in parallel electrically with said lamp receiving means and said lamp control switch, the photoresistive device controlling energization of the relay as a function of field brightness, in which the relay is energized to (a) hold the lamp control switch in the open condition against the bias of the spring means to disable the firing circuit when the ambient field light is above a predetermined level, and (b) to permit the spring means to hold the lamp control circuit in the closed condition to enable lamp firing when ambient field light is below the predetermined level.

References Cited by the Examiner
UNITED STATES PATENTS

| 3,073,226 | 1/1963 | Greger | 95—10 |
| 3,087,398 | 4/1963 | Greger | 95—10 |

JOHN M. HORAN, *Primary Examiner*.